(12) United States Patent
Schroeder et al.

(10) Patent No.: US 6,405,060 B1
(45) Date of Patent: *Jun. 11, 2002

(54) USER INTERFACE WITH IMPROVED DATA ENTRY FEATURES FOR TELEPHONE SYSTEM

(75) Inventors: Martin K. Schroeder, San Diego, CA (US); Duane Sharman, Calgary (CA)

(73) Assignee: Cirrus Logic, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/994,559

(22) Filed: Dec. 19, 1997

Related U.S. Application Data

(63) Continuation of application No. 08/504,121, filed on Jul. 19, 1995, now Pat. No. 5,797,098.

(51) Int. Cl.$^7$ .............................. H04B 1/38; H04Q 7/32
(52) U.S. Cl. ...................... 455/566; 345/169; 707/532
(58) Field of Search .................................. 455/464, 564, 455/566, 550, 535, 90; 379/355; 707/530, 531, 532, 535; 345/168, 169

(56) References Cited

U.S. PATENT DOCUMENTS

| | | | |
|---|---|---|---|
| 4,158,236 A | * 6/1979 | Levy | .......................... 707/532 |
| 4,559,598 A | * 12/1985 | Goldwasser et al. | ........ 364/419 |
| 4,661,916 A | 4/1987 | Baker et al. | ............. 364/513.5 |
| 5,128,672 A | * 7/1992 | Kaehler | ....................... 345/168 |
| 5,153,904 A | 10/1992 | Coombes et al. | ............. 379/58 |
| 5,535,260 A | * 7/1996 | Zicker et al. | .................. 379/63 |
| 5,633,912 A | * 5/1997 | Tsoi | ............................ 455/566 |

* cited by examiner

Primary Examiner—Edward F. Urban
(74) Attorney, Agent, or Firm—Skjerven Morrill MacPherson LLP

(57) ABSTRACT

An improved user interface for a cellular telephone system subscriber unit, including the following functions: (1) a predictive keyboard input method for speeding up input on a telephone with a space limited keyboard; (2) a word completion method for speeding up input; (3) a distinctive signaling method useful in a dual-mode or tri-mode cellular phone system that incorporates both voice call functionality and data messaging functionality; (4) a secret message method that permits secret messages to be received by an authorized user of a cellular telephone that includes a data messaging capability; (5) a message screening method that permits a user to set a message screening mode in a cellular telephone; (6) an improved "scratchpad" method which permits a user to enter a telephone number into a storage register of a cellular telephone while in the middle of a voice call, visually verify the entry, and then save the number to a rapid redial location for later use; (7) a global search method for searching text strings in all of the different memory sections of a cellular telephone having an address book, a hierarchical menu structure, and stored data messages.

6 Claims, 14 Drawing Sheets

|   |         |     |     |     |     |     |     |     |     |
|---|---------|-----|-----|-----|-----|-----|-----|-----|-----|
| a | <start> | S   |     | C   |     | P   |     | A   |     |
|   |         | T   |     | F   |     | M   |     | →   |     |
| b | P       | R   |     | E   |     | O   |     | A   |     |
|   |         | L   |     | P   |     | I   |     | →   |     |
| c | L       | E   |     | A   |     | L   |     | I   |     |
|   |         | Y   |     | O   |     | D   |     | →   |     |
| d | E       | R   |     | D   |     | S   |     | N   |     |
|   |         | A   |     | C   |     | L   |     | →   |     |
| e | A       | R   |     | L   |     | T   |     | N   |     |
|   |         | C   |     | S   |     | I   |     | →   |     |
| f | S       | T   |     | E   |     | I   |     | S   |     |
|   |         | O   |     | U   |     | H   |     | →   |     |
| g | E       | R   |     | D   |     | S   |     | N   |     |
|   |         | A   |     | C   |     | L   |     | →   |     |
| h | <sp>    | S   |     | C   |     | P   |     | A   |     |
|   |         | T   |     | F   |     | M   |     | →   |     |
| i | C       | E   |     | O   |     | T   |     | A   |     |
|   |         | H   |     | I   |     | L   |     | →   |     |
| j | A       | R   |     | L   |     | T   |     | N   |     |
|   |         | C   |     | S   |     | I   |     | →   |     |
| k | L       | E   |     | A   |     | L   |     | I   |     |
|   |         | Y   |     | O   |     | D   |     | →   |     |
| l | L       | E   |     | A   |     | L   |     | I   |     |
|   |         | Y   |     | O   |     | D   |     | →   |     |
| m | <sp>    | S   |     | C   |     | P   |     | A   |     |
|   |         | T   |     | F   |     | M   |     | →   |     |
| n | →       | R   |     | D   |     | B   |     | W   |     |
|   |         | E   |     | L   |     | H   |     | →   |     |
| o | H       | E   |     | O   |     | A   |     | I   |     |
|   |         | T   |     | U   |     | R   |     | →   |     |
| p | O       | N   |     | R   |     | U   |     | M   |     |
|   |         | W   |     | L   |     | O   |     | →   |     |
| q | M       | E   |     | A   |     | O   |     | I   |     |
|   |         | P   |     | S   |     | B   |     | →   |     |
| r | E       | R   |     | D   |     | S   |     | N   |     |
|   |         | A   |     | C   |     | L   |     | →   |     |

FIG. 3

USER INTERFACE WITH IMPROVED DATA ENTRY FEATURES FOR TELEPHONE SYSTEM

This is a continuation of application U.S. Ser. No. 08/504,121 filed on Jul. 19. 1995, now U.S. Pat. No. 5,797,098

BACKGROUND OF THE INVENTION

1. Field of the Invention

This invention relates to electronic cellular telephone systems, and more particularly to an improved user interface for a cellular telephone system subscriber unit.

2. Description of Related Art

Cellular telephones have become very popular as communication devices. Typical cellular telephones are small, hand-held devices that provide a keypad for data entry and a display to see the results of such entry. As the popularity of hand-held cellular telephones has increased, the number of features offered by such devices has increased.

A problem with the numerous features offered by cellular telephones is that they are frequently difficult to use. Because of the limited keyboard (typically a 0–9 numeric keypad plus several additional function keys) and the limited amount of display (commonly only a single fine), accessing and using such features as telephone directories, "canned" messages, security features, and the like are often confusing and difficult.

Accordingly, it is desirable to have a hand-held cellular telephone system that offers various "user-friendly" features that are easy to use despite the space limitations of a keyboard and display inherent in a hand-held design. The present invention overcomes these limitations by providing innovative ways in which to enter data and access a number of user convenient features, including improved search capabilities, security features, and alphanumeric data entry features.

SUMMARY OF THE INVENTION

An improved user interface for cellular or mobile phones, including the following functions:

(1) A predictive keyboard input method that initially displays to a user the most commonly used characters for selected words in a particular language (e.g., English), associating those characters with programmable keys, and then accepting the user's put Thereafter, a next set of characters is displayed that are most likely to occur after the character previously input by the user.

(2) A word completion method in which a telephone displays user-defined or pre-defined candidate words matching initial characters input by a user, and assigns those candidate words to one or more available programmable keys. If one of the candidate words is the word being entered by the user, then the user need only press the associated programmable key to have the entirety of the candidate word automatically entered into the display.

(3) A distinctive signaling method useful in a dual-mode or tri-mode cellular phone system that incorporates both voice call functionality and data messaging functionality. Distinctive signaling is used to distinguish incoming voice calls from incoming data messages, and further to distinguish between various different data message types by examining header information in a received data message.

(4) A secret message method that permits secret messages to be received by a user of a cellular telephone that includes a data messaging capability. An incoming messages is received and stored before being displayed. All or selected received and stored messages are blocked from being displayed to persons other than the intended recipient by requiring input of a personal identification number or code. In an alternative embodiment a received message indicates its source and requires the receiver to input a code corresponding to the source, thus allowing each sender to "encrypt" a message with a key unique to the sender, which the receiving party must know in advance to "decrypt".

(5) A message screening method that permits a user to set a message screening mode in a cellular telephone. This mode allows screening of incoming data messages, such as in a CDPD system When an incoming data message is received by a cellular telephone, an ID field from a header in the incoming data packet is examined to determine whether the source of the message is not from an "included" list or is from an "excluded" list. Screened out messages are discarded, flagged as low priority, or rejected before acceptance to lower user communication costs.

(6) An improved "scratchpad" method which permits a user to enter a telephone number into a storage register of a cellular telephone while in the middle of a voice call, visually verify the entry, and then save the number to a rapid redial location for later use.

(7) A global search method for searching text strings in all of the different memory sections of a cellular telephone having an address book, a hierarchical menu structure, and stored data messages.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 1b shows a block diagram of a processing system for implementing a cellular telephone of the type shown in FIG. 1a.

FIG. 3 shows an example of use of the predictive keyboard input process of the present invention.

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Figure 1A:
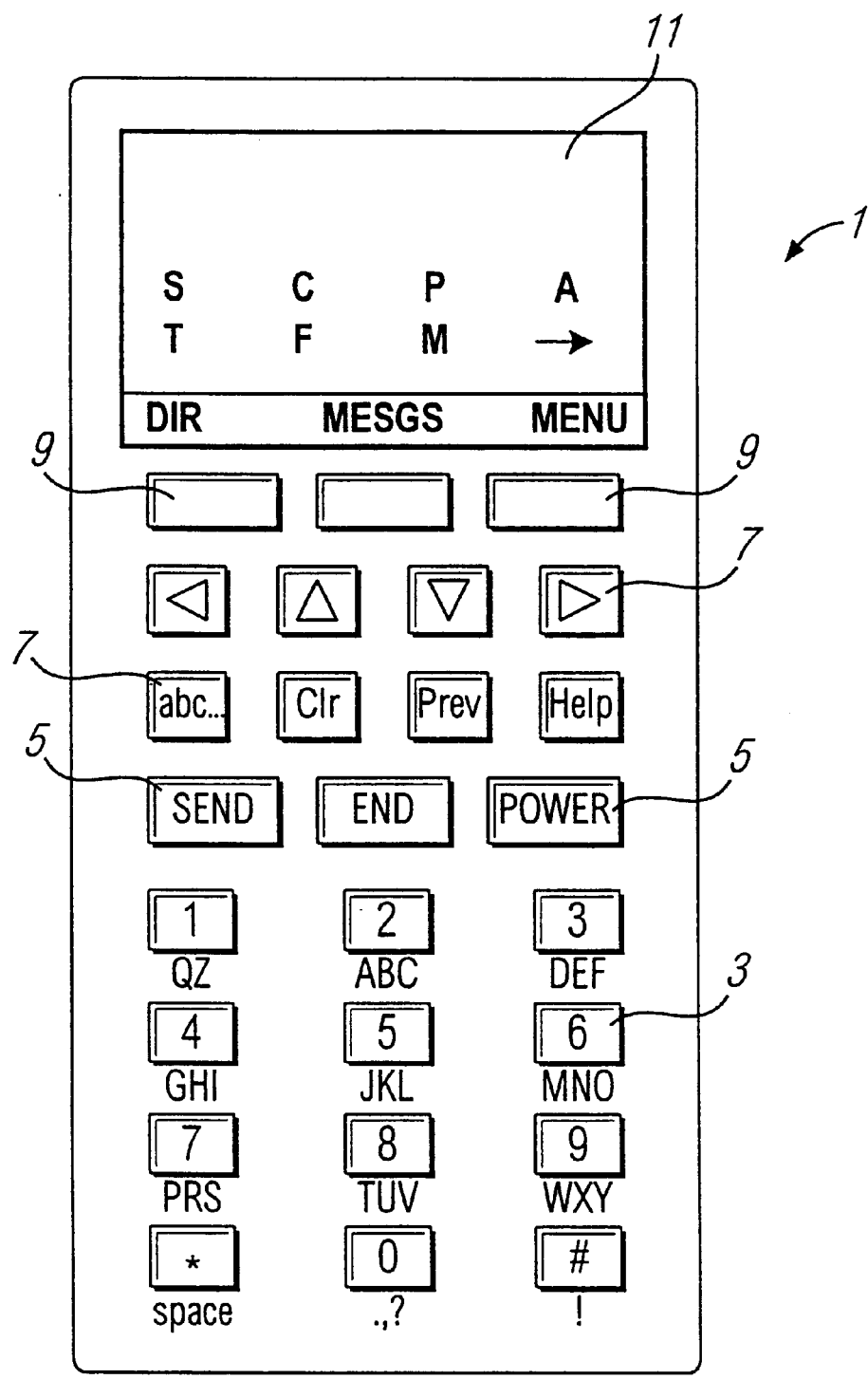
FIG. 1a shows a front view of the preferred embodiment of a keyboard and display of a hand-held cellular telephone in accordance with the present invention.

FIG. 1a shows a preferred embodiment of the keyboard and display of a hand-held cellular telephone 1 (also known as a subscriber unit) in accordance with the present invention. A conventional telephone keypad 3 is provided, along with dedicated keys 5 for the functions "SEND", "END", and "POWER". In the preferred embodiment, the telephone 1 also includes a set of eight programmable keys 7 that have an initial dedicated function, but are also programmable in the sense that additional functions can be assigned to any of the eight keys. In addition, three "soft" keys 9 are provided. Text messages, icons, or the like may be associated with any one of the three soft keys 9 by displaying the associated symbol or text directly above a soft key 9 on a display 11, in known fashion.

The display 11 in the preferred embodiment is a mult-line (for example, 4 to 5 text lines) alphanumeric display that may be implemented as a dot matrix addressable display or a combination of a dot matrix addressable display and dedicated icons or symbols. In the preferred embodiment, the display 11 is implemented using a liquid crystal display, but other display technologies, such as LED, EL, etc., may be used.

The keys of the cellular telephone 1 may be implemented using any convenient keyboard technology, such as touch panel, membrane, mechanical, or optical switches.

Figure 1B:
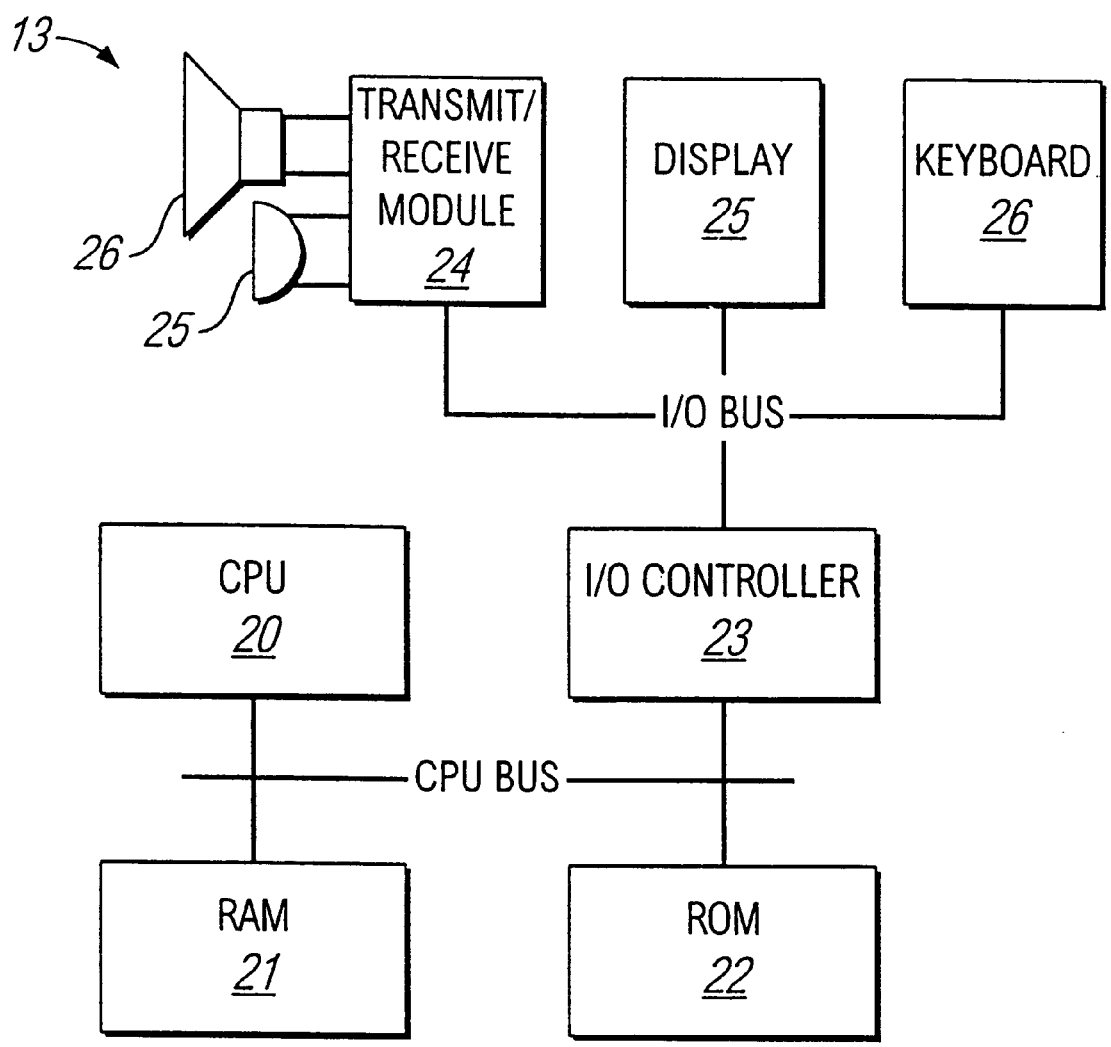

FIG. 1b shows a block diagram of a programmable processing system 13 for implementing a cellular telephone 1 of the type shown in FIG. 1a. The processing system 13 preferably includes a CPU 20, a RAM 21, a ROM 22 (preferably writable, such as a flash ROM) and an I/O controller 23 coupled by a CPU bus. The I/O controller 23 is coupled by means of an I/O bus to a transmit/receive module 24. The transmit/receive module 24 is for receiving and transmitting analog carrier wave forms with analog or digital information imbedded therein, and decoding digital portions of such wave forms for output to the I/0 bus, and analog portions of those wave forms for output to a speaker 26. Input to the transmit/receive module includes analog wave forms from a microphone 25. Also coupled to the I/O bus is a display 27 and a keyboard 28. The programmable processing system 13 may be pre-programmed, or may be programmed (and reprogrammed) by downloading a program from another source (e.g., another computer).

In the preferred embodiment, the cellular telephone 1 combines both conventional voice functionality (e.g., in accordance with AMPS—American Mobile Phone System—analog cellular receive and transmit functions) with digital data message capability (e.g., in accordance with the CDPD standard In an alternative embodiment, both an analog voice cellular system, such as AMPS, is combined with a digital voice transmission system, using for example the TDMA (Time Division Multiple Access) or CDMA (Code Division Multiple Access) protocols, along with a data transmission system, such as CDPD. An example of such a tri-mode cellular telephone 1 is disclosed in co-pending U.S. Pat. application Ser. No. 08/117913, assigned to the assignee of the present invention.

As FIG. 1a should make clear, both the keyboard and the display 11 have limited ability to enter or display data Indeed, as is common, the telephone number keypad 3 has 2 or 3 letters or symbols assigned to virtually every key. Accordingly, the present invention addresses a variety of methods for overcoming the limitations of such a hand-held unit.

Predictive Keyboard Input

One problem specifically addressed by the present invention is the entry of text information into the display 11. For example, a directory for telephone numbers is provided in the preferred embodiment that permits associating a text string, such as the name of a person, with numeric data. Accordingly, some means must exist to enter such text. Furthermore, since the preferred embodiment of the present invention can be used for transmitting data according to a data transmission protocol, such as CDPD, it is important to be able to enter text messages for transmission.

In order to ease the problem of entering text using a limited keyboard, such as that shown in FIG. 1a, the present invention provides for predictive keyboard input. Predictive keyboard input provides a method for initially displaying to a user the most commonly used characters for selected words in a particular language (e.g., English), associating those characters with programmable keys, and then accepting the user's input. Thereafter, a next set of characters is displayed that are most likely to occur after the character previously input by the user.

Referring to FIG. 1a, a hand-held cellular telephone 1 is shown with a set of seven characters depicted in the display 11. The characters are paired and stacked vertically so as to correspond to seven of the eight programmable keys 7 on the telephone 1. The eighth display position is for a symbol or entry indicating "more", allowing a user to page to a different set of seven characters if a desired character is not in the group of seven currently displayed. An arrow symbol is shown in FIG. 1 to indicate the "more" function. The "more" symbol itself is assigned to one of the programmable keys 7. Thus, referring to FIG. 1, to select the character "A" for text entry, a user would push the programmable key 7 that physically corresponds to the displayed "A", being the "right arrow" cursor key in the top right-hand corner of the eight programmable keys 7. This physical mapping of the characters or symbols in the display 11 with the programmable keys 7 provides for a more intuitive interface for a user. In particular, each programmable key 7 is assigned one and only one character or symbol at any one time, in contrast to a conventional telephone keypad, which has 2 to 3 characters assigned to each button 3.

Figure 2:
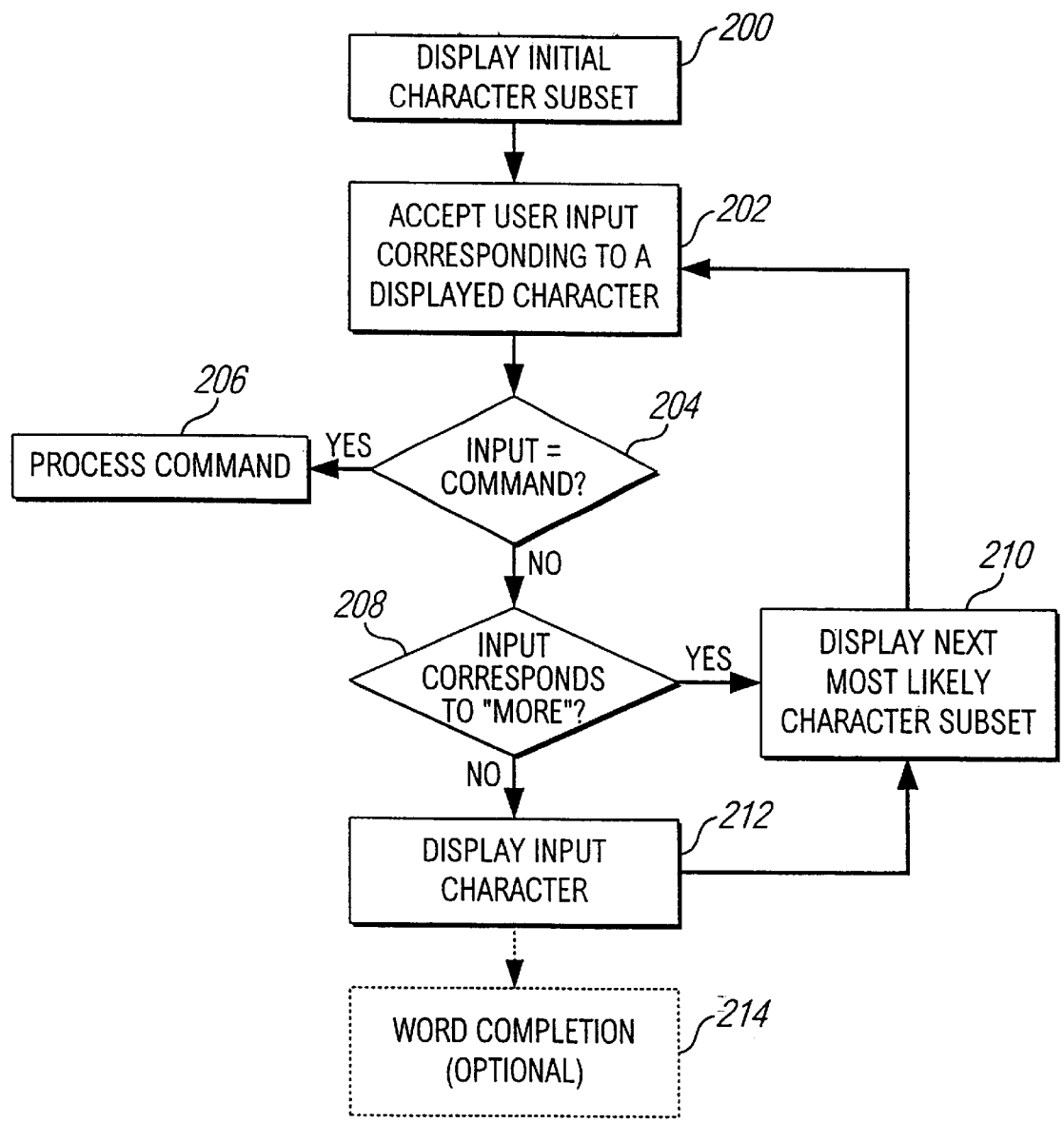
FIG. 2 shows a flowchart depicting a preferred method for implementing the predictive keyboard input process of the present invention.

FIG. 2 shows a flowchart depicting a preferred method for implementing the predictive keyboard input process of the present invention. When in text entry mode, an initial character subset is displayed (STEP 200). The telephone 1 accepts user input from the keyboard (STEP 202). In the preferred embodiment, if the input is a command (such as "SEND MESSAGE") (STEP 204), then the telephone 1 process the command (STEP 206). If the input corresponds to the "more" function (STEP 208), then the display is changed to show the next most likely character subset (STEP 210), and processing continues back at STEP 202.

If the input is a keypress of a programmable key 7 corresponding to one of the displayed characters, that character is displayed on the display 11 as text entry (STEP 212). The display 11 is then changed to show the next most likely character subset, based on the previous character entry (STEP 210), and processing continues back at STEP 202. In the preferred embodiment, an optional word completion function (described below) may be implemented (STEP 214).

The determination of which characters to display in a particular subset can be made by statistical analysis of sample text from a particular language. For example, applicants have determined, from a set of particular English words commonly used for simple messages (e.g., "call", "meet", "today", "tomorrow", etc.), that the seven most common initial characters are those shown in the display 11 of FIG. 1. Pressing the "more" function key would display the next seven most common initial characters, and so forth. In the preferred embodiment, a table is constructed in memory having (1) the characters of the English alphabet ranked in order of their occurrence as initial characters of English text, and (2) an entry for every individual character of the alphabet, with each entry comprising a list of the most common characters occurring after each such character. For example, for the character "A", the list entry would be the 25 characters of the alphabet in order of their statistical occurrence after the character "A". The 25 characters would then be displayed 7 at a time in the illustrated embodiment of the invention. In an alternative embodiment of the present invention, the table can take into account the preceding N characters, rather than just the preceding single character entered by the user. For example, a table could be constructed whereby, if a user enters the characters "th", the frequency of characters occurring after that combination are determined and made entries in the table. Other rules for generating the character subsets may be adopted as desired.

In an alternative embodiment, the cellular telephone 1 allows a user to enter a list of words that the user frequently uses in messages (e.g., names, locations, products, etc.) and the internal CPU 20 builds a character frequency table from that specific set of words. In yet another embodiment, the cellular telephone 1 comes with a pre-defined set of character frequencies, which may be modified by analyzing the character frequencies of messages entered by a user over time, so that the table of character frequencies automatically adapts to the types of words used by the user.

FIG. 3 shows an example of the predictive keyboard input aspect of the present invention. Each right-hand entry in FIG. 3 represents characters that would be displayed in the display 11 of a hand-held unit in accordance with the present invention. The left-most column indicates either the initial display (row a), or the characters or symbols entered by a user (rows b-r). The example phrase to be entered is "PLEASE CALL HOME". As can be seen, the initial character "P" is one of the characters initially shown in the display 11. When the user presses the programmable key 7 corresponding to the character in, the character subset shown in the display shifts to a new set, comprising the seven characters most likely to occur after the character "P". As can be seen in row b, the next character to be entered, "L", is already shown in the shifted display. Continuing on in this fashion, the entire phrase "PLEASE CALL" can be entered simply by selecting one of the programmable keys 7 corresponding to one of the characters shown in the display 11. Note that it is not until row n is reached that the "more" function has to be invoked, since the character "W" does not appear in the display after the "space" character is entered in row m. However, the character "H" does occur in the next displayed character subset after invoking the "more" function, as shown in row n. Thereafter, the rest of the message can be entered without having to use the "more" function.

Thus, the predictive keyboard method of the present invention allows a user of a hand-held cellular telephone 1 to easily enter text into the display 11 using programmable keys 7 that correspond to single characters or symbols at any one moment in time.

Word Completion

Figure 4:
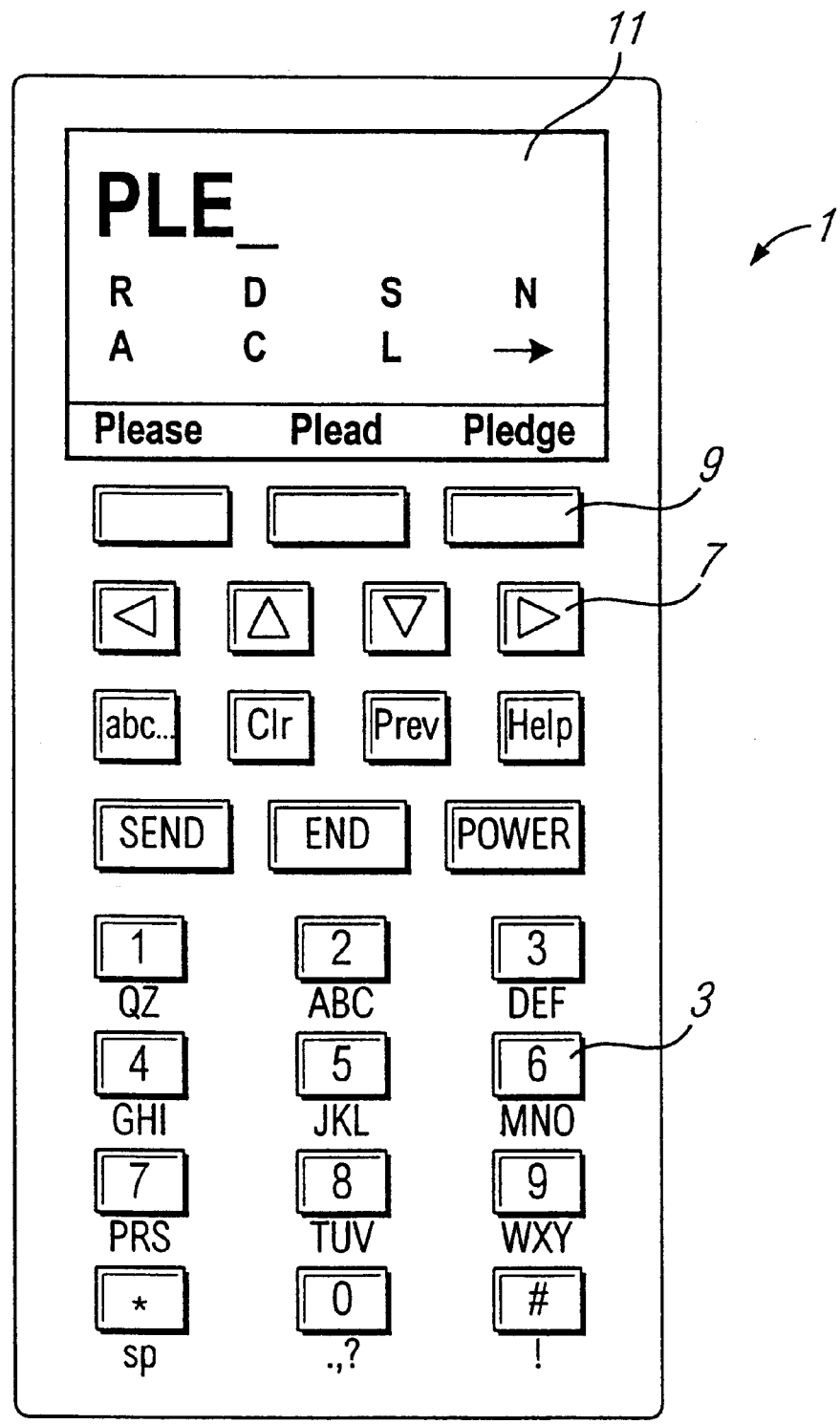
FIG. 4 shows a font view of the preferred embodiment of a keyboard and display of a hand-held cellular telephone in accordance with the present invention, showing an example of the word completion process of the present invention.

Although the predictive keyboard input method discussed above substantially reduces the difficulty of entering text into the limited keyboard and display of a cellular telephone 1, it still requires that the user enter each character of a word. Since cellular telephones are frequently used "on the go", it would be useful to have a method of speeding up text input. FIG. 4 shows a preferred embodiment of one such method, in which the telephone 1 displays candidate words matching initial characters input by a user, and assigns those candidate words to one or more available soft keys 9 and/or programmable keys 7 of the telephone 1. For example, as shown in FIG. 4, if the user has entered the letters "PLE" in the display 11 (either using prior art techniques, or the predictive keyboard input technique described above), a dictionary lookup routine may display the word "PLEASE", "PLEAD", and "PLEDGE" on a portion of the display 11 so that the candidate words are placed adjacent to associated soft keys 9. If one of the candidate words is the word being entered by the user, then the user need only press the associated soft key 9 to have the entirety of the candidate word automatically entered into the display 11. Thus, for example, if the user was entering the word "PLEASE", and had already entered the letters "PLE", the user need only press the left-most soft key 9 shown in FIG. 4 to enter the entirety of the word "PLEASE". As a convenience, a space character can be automatically placed after each completed word, and the first word after sentence-ending punctuation (e.g., period, question mark, exclamation mark, etc.) can be displayed with an initial capital letter.

Figure 5:
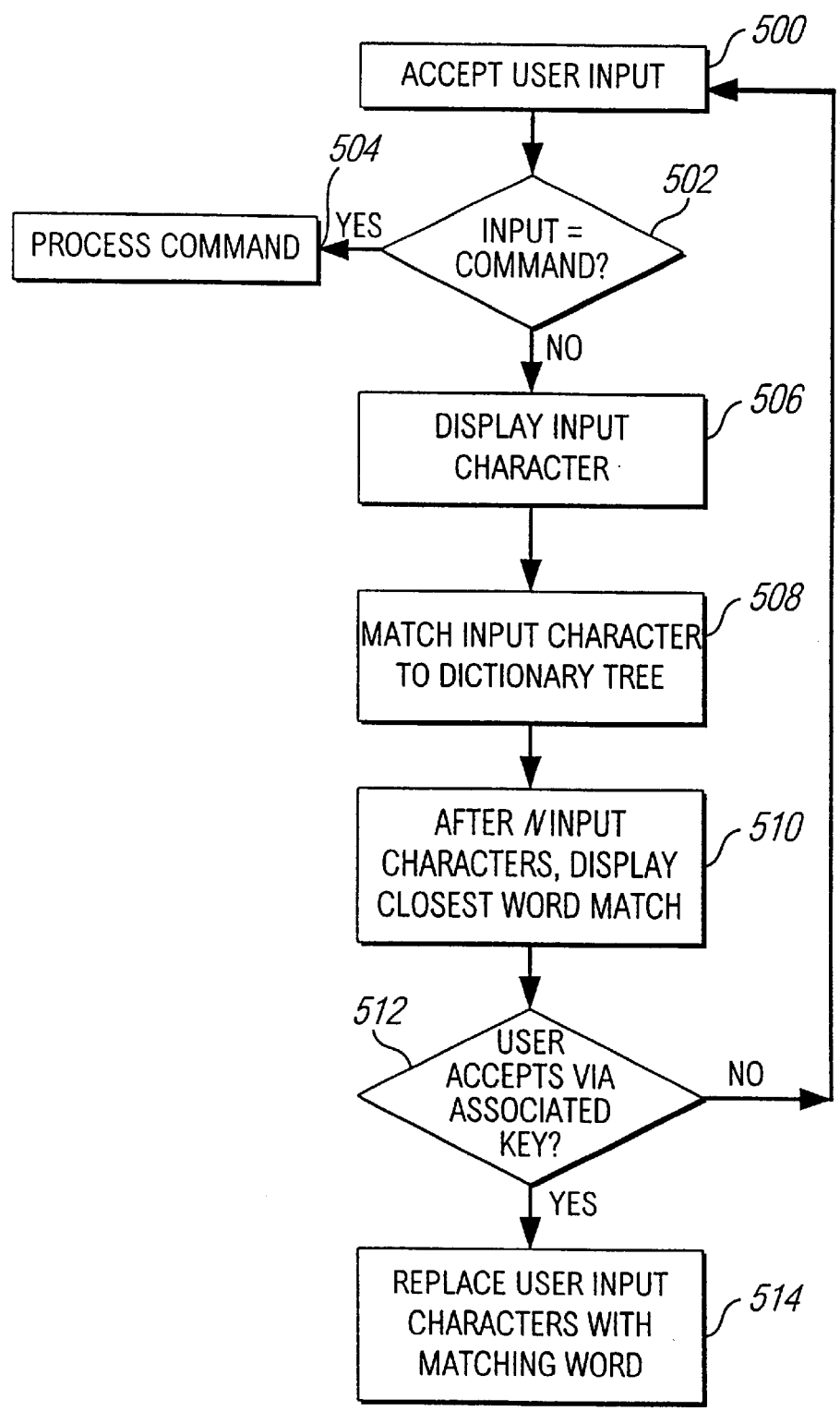
FIG. 5 shows a flowchart depicting a preferred method for implementing the word completion process of the present invention.

FIG. 5 shows a flowchart of this process. The telephone 1 accepts the user's input (STEP 500). If the input is a command (STEP 502), then the command is processed in conventional fashion (STEP 504). Otherwise, the input is displayed as a character (STEP 506). The processing system 13 within the unit then matches the input character to a dictionary tree (described below) (STEP 508). As soon as enough characters N (for example, 2 or 3 characters) have been input by the user to determine at least one plausible candidate word in the dictionary tree, one or more of the candidate words are associated with corresponding soft keys 9 and shown in the display 11 of the telephone 1 (STEP 510). In the example shown in FIG. 4, up to three candidate words may be displayed in the bottom-most portion of the display 11 such that the candidate words are associated with the three soft keys 9. If the available display area is larger, then additional candidate words can be shown. For example, if room for two rows of candidate words were available, the programmable keys 7 could be used instead of the soft keys 9 to be associated with or mapped to the candidate words.

Thereafter, if the user accepts one of the candidate words by pressing an associated soft key 9, the current word being input by the user is replaced by the candidate word, and displayed in the display 11 (STEP 514). The user can continue entering text or commands as desired. If the user does not accept one of the candidate words (STEP 512), additional input is accepted from the user (STEP 500).

In an alternative embodiment, if no match occurs after a preset number of characters has been entered, the list of candidate words shown in display 11 is cleared to avoid confusion.

Figure 6:
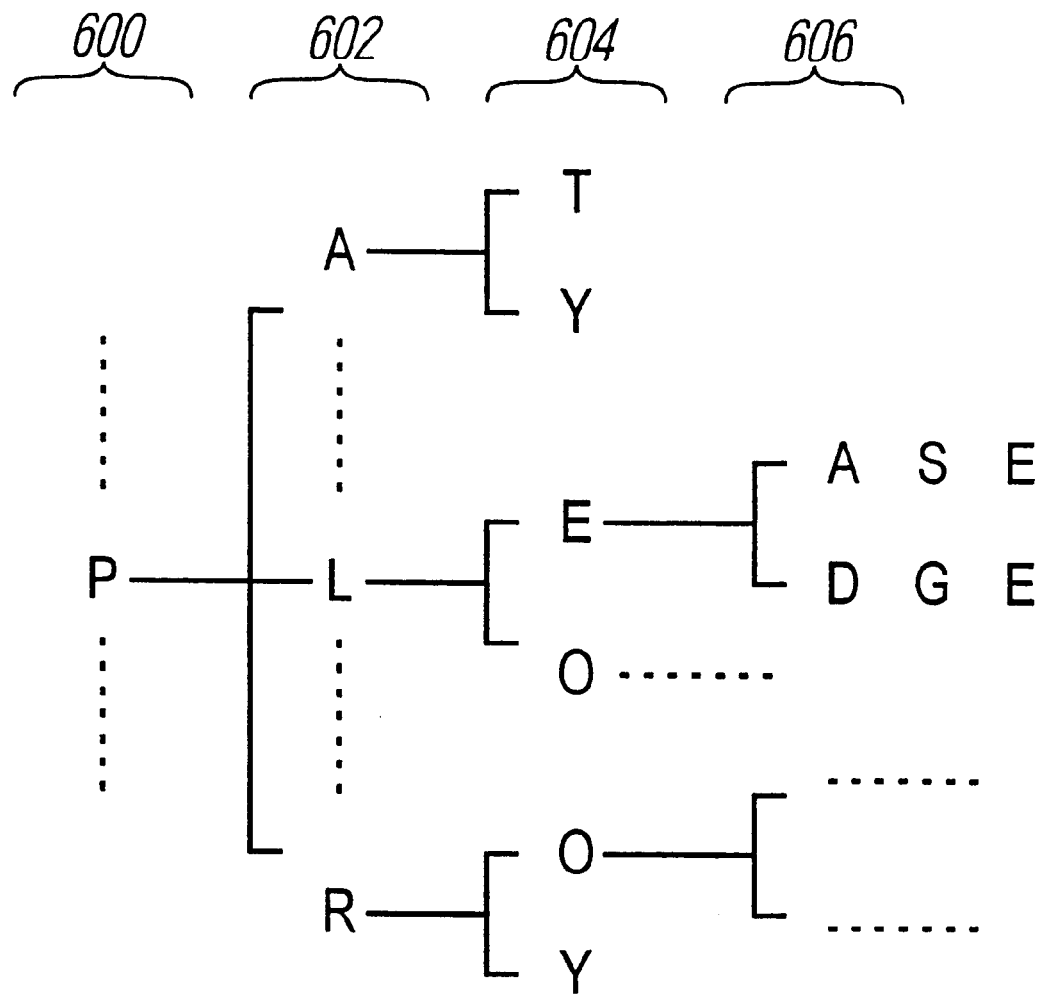
FIG. 6 shows a diagram of a portion of a dictionary tree, showing how the search function used for the word completion process of the present invention can be implemented.

FIG. 6 shows a diagram of a portion of a dictionary tree, showing how the search function used for the word completion can be implemented. In the example shown, a first tier 600 has individual letters of the alphabet, the letter "P" being shown. A next tier 602 of the dictionary tree contains letters of words in the dictionary that follow the letter of the preceding tier. In the example shown, the letters "A", "L", and "R" are shown. Additional tiers 604, 606 may be used to extend the dictionary tree, as shown in FIG. 6. The "leaf" nodes of the dictionary tree may contain single letters (such as the entry "P-A-T") or multiple letters (such as the entry "P-L-E-ASE"). The dictionary tree may be as extensive as desired. Although a dictionary tree is shown, other methods may be used for matching input characters to plausible candidate words, such as a dictionary look-up table. The implementation of such dictionary trees or lookup tables in the computer arts is well known.

In the preferred embodiment the dictionary tree is predefined, but modifiable by the user. That is, the user can enter words (e.g., names, locations, products, etc.) commonly used by the user, and the CPU 20 is programmed to index such words into the dictionary tree in known fashion. Thus, if the user frequently inputs the word "Massachusetts", the user places the telephone 1 into an edit mode, enters the characters for "Massachusetts", and the CPU 20 inserts a leaf node and pointers into the dictionary tree so that "Massachusetts" is after "major" and before "master" (as an example only).

Alternatively, the words in the dictionary can be statistically determined in part from sample text, including text previously input by the user into the cellular telephone unit. That is, new words input by the user can be automatically added to the dictionary based on frequency of input of such new words. For example, if the telephone 1 can hold 100 new words, all new words not found in the pre-defined dictionary would be automatically indexed and added to the dictionary. In addition, the frequency of use of each such word can be counted by associating an additional count or time stamp field with each word. Once the new word capacity of the telephone 1 is exhausted, a least recently used algorithm can be used to replace infrequently used words with new words more recently input by the user.

Thus, the word completion aspect of the present invention provides a means for rapid entry of common words into a hand-held cellular telephone 1 without requiring keying each letter of such words.

Distinctive Signaling

Another aspect of the present invention useful in a dual-mode or tri-mode cellular phone system that incorporates both voice call functionality and data messaging functionality is an improved form of distinctive signaling. In prior art land line telephone systems, distinctive signaling provides a unique auditory signal on one telephone to indicate incoming calls from one of several input lines. In the present context, distinctive signaling is used to distinguish incoming voice calls from incoming data messages, and further to distinguish between various different possible types of data messages.

Figure 7:
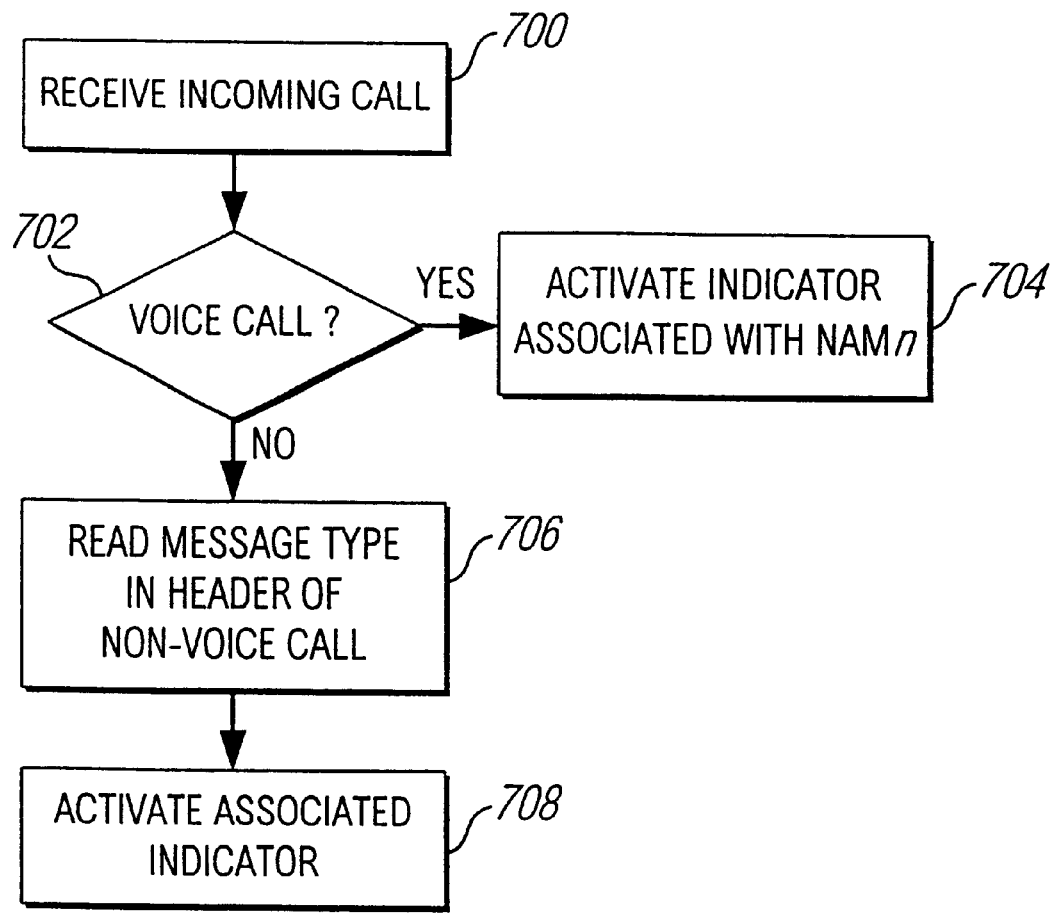
FIG. 7 shows a flowchart depicting a preferred method for implementing the distinctive signaling process of the present invention.

A flowchart of the inventive distinctive signaling method is shown in FIG. 7. The cellular telephone 1 receives an incoming call in conventional fashion (STEP 700). If the call is a conventional analog voice call (e.g., from an AWS system), the telephone 1 will use conventional analog voice circuitry to receive that call. Since only the voice circuitry is activated, it can be determined that the incoming call is voice and not data (STEP 702). Further, it can be determined whether an incoming voice call is associated with a particular NAM ("Number Assignment Module"). This is done in known fashion by monitoring the analog voice system control channel. Consequently, a different indicator can be associated with each NAM available within a cellular telephone unit 1 (STEP 704). The indicator may be, for example, auditory (such as conventional distinctive ringing), vibratory (to give a tactile indication to a user without being conspicuous), visual (such as different blinking patterns or messages in the display 11), or any combination of the above, such that the indicator associated with a particular NAM is distinctive.

If the incoming call is not a voice call, but is instead a data call, the header of the data packet (such as the header of a conventional CDPD data packet) is examined to determine the message type (STEP 706). For example, the preliminary (5-10-95) Protocol Specification for a Short Message Service Over CDPD ("SMS-CDPD"), published by the assignee of the present invention and herein incorporated by reference, specifies one header structure that can be used by the present invention. As one example, only, the SMS-CDPD protocol specifies an application layer header having a code that indicates that an incoming message is a pager call, a voice mail notification call, or a data message call. Other information that may be stored in an incoming data packet may include the address, source, and/or class of the message. Accordingly, since each message can be distinguished by type and/or by source, a distinctive indication can be associated with each such message type to alert the user not only that a data message call has been received, but the nature of the message (STEP 708). Again, as described above, the indicator associated with a particular message type may be auditory, vibratory, visual, or a combination of the above.

Secret Message Processing

Another aspect of the present invention permits secret messages to be received by a user. This aspect of the invention is used in conjunction with cellular telephones that include a data messaging capability. In such systems, incoming messages can be received and stored before being displayed. The present invention takes advantage of this characteristic by providing a way for preventing all or selected received and stored messages from being displayed to persons other than the intended recipient.

Figure 8:
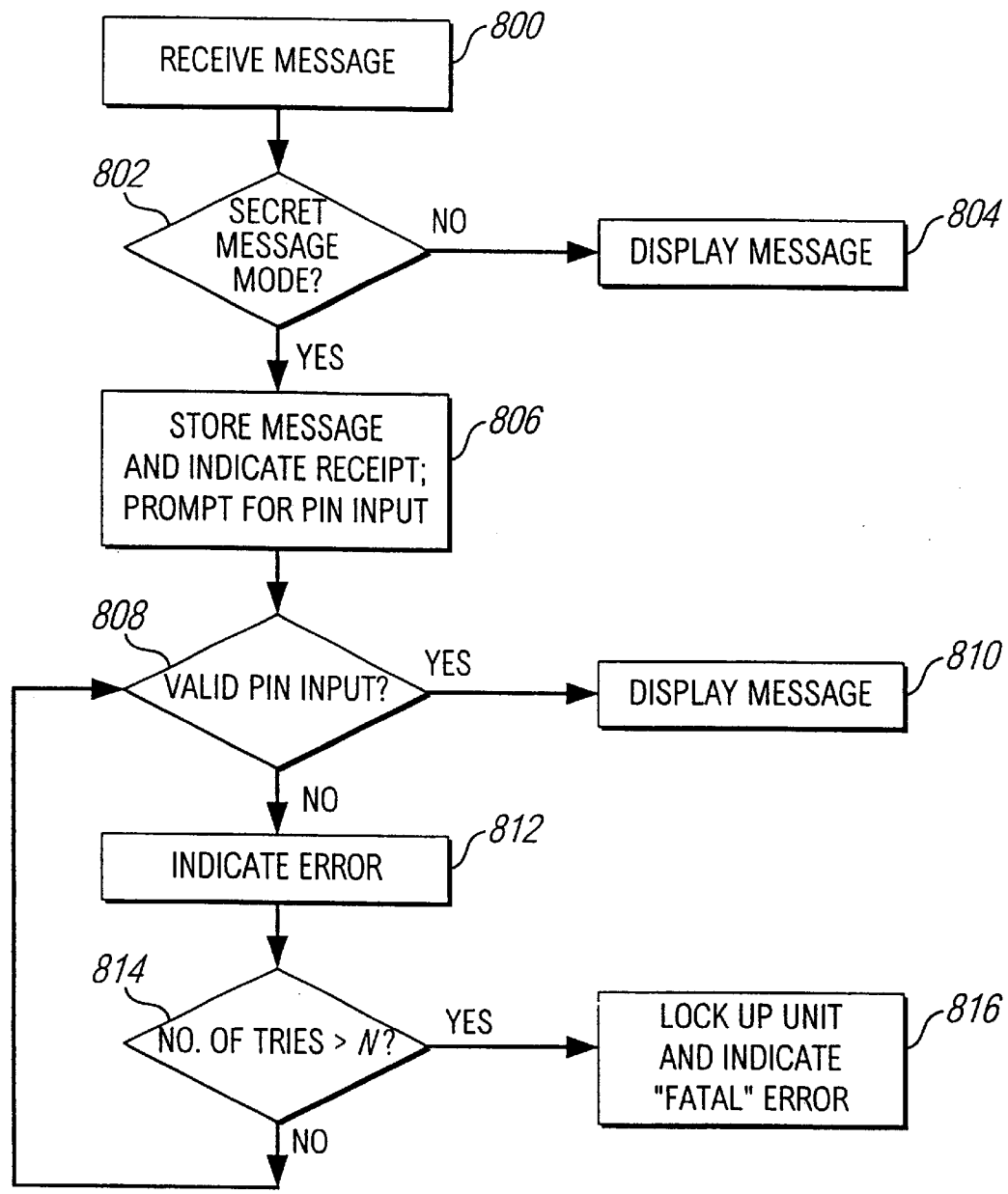
FIG. 8 shows a flowchart depicting a preferred implementation of the secret message process of the present invention.

FIG. 8 shows a flowchart showing the preferred implementation of the secret message process of the present invention. A cellular phone system of the type shown in FIG. 1a initially receives a data message (STEP 800). The telephone 1 can test to see whether or not it has been set to a secret message mode (STEP 802), if all incoming messages are to be hold secret until authorized for display. Alternatively, the telephone 1 may be programmed to inspect a header of each incoming data packet to determine if a "secret or private" secrecy Bag or code has been set by the sender.

If a received message is not flagged as secret or private, or the telephone 1 is not set to a general secret message mode, the message is displayed in conventional fashion (STEP 804). If a received message is flagged as secret or private, or if the secret message mode has previously been activated by the user, the message is stored and an indication of receipt given to the user. The telephone 1 also prompts the user for an authorization code, such as a Personal Identification Number ("PIN") (STEP 806). If the user inputs a valid PIN (STEP 808), the stored message is displayed (STEP 810). If a valid PIN has not been input, an error is indicated (STEP 812). As an optional security measure, if the number of attempts to input the PIN exceeds a preset number N (STEP 814), the cellular telephone 1 disables itself and indicates a "fatal" error requiring dealer service (STEP 816). Otherwise, the user is re-prompted for a valid PIN input.

In an alternative embodiment, a received secret message indicates its source (e.g., by name, telephone number, or some other code) and requires the receiver to input a code corresponding to the source. This allows each sender to "encrypt" a message with a key unique to the sender, which the receiving party must know in advance to "decrypt". For example, a secret message sent by a remote office manager to the recipient can require that the recipient unlock the message by inputting the office manager's coder rather than the recipient's PIN.

Accordingly, this aspect of the present invention provides security for incoming data messages not provided by the prior art.

Message Screening Process

Figure 9:
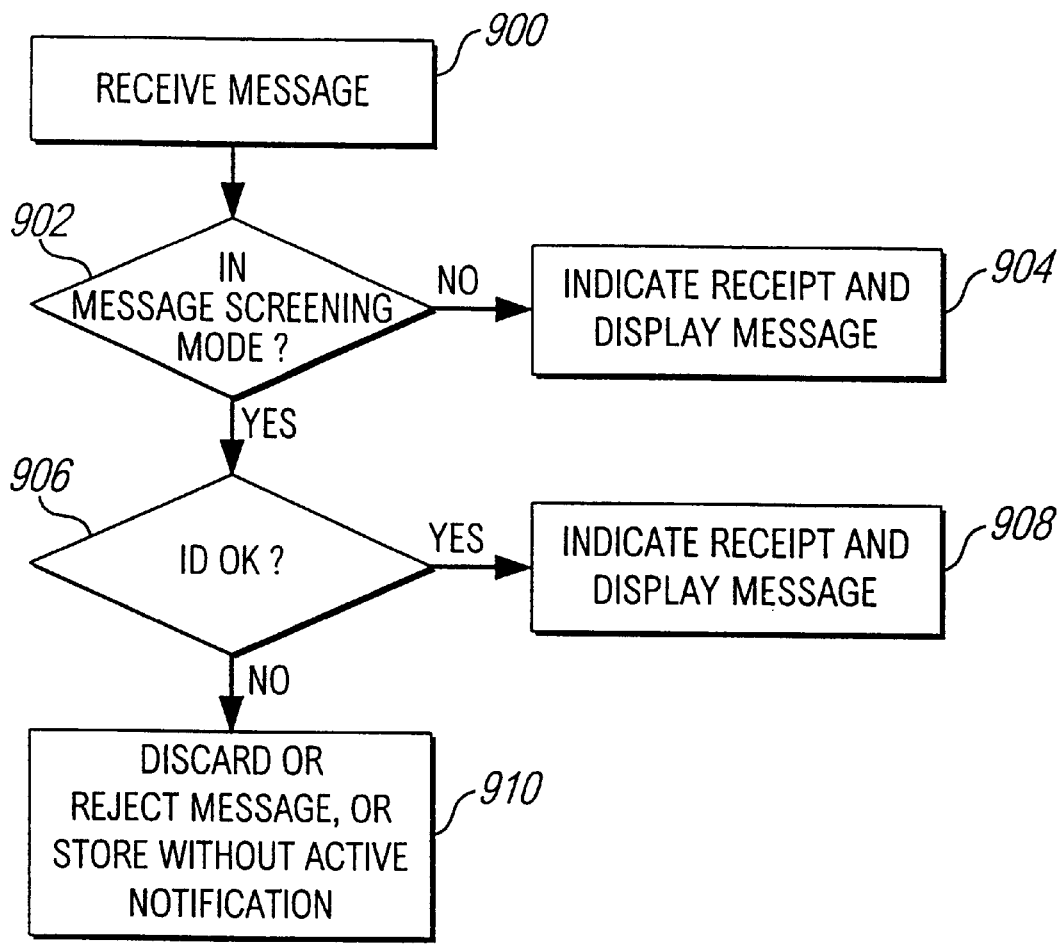
FIG. 9 shows a flowchart depicting a preferred implementation of the message screening process of the present invention.

Another aspect of the present invention permits a user to set a message screening mode in a cellular telephone. This mode allows screening of incoming data messages, such as in a CDPD system FIG. 9 shows a flowchart of the preferred implementation of this aspect of the invention. When an incoming data message is received by a cellular telephone 1 (STEP 900), the telephone 1 determines whether it is in the "message screening" mode (STEP 902). If not, the telephone 1 indicates receipt of the message and displays the message in conventional fashion (STEP 904).

If the telephone 1 is in message screening mode, an ID field from a header in the incoming data packet is examined to determine whether the source of the message is from a user-defined "included" list (STEP 906). In an alternative embodiment the source ID of the incoming message is examined to determine whether it is from a user-defined "excluded" list.

If the received message is not to be screened out, then the message is displayed and the telephone 1 indicates receipt of the message to the user (STEP 908). If the received message is not from the included list (or alternatively is from the excluded list), then the message can be discarded by erasing it from the memory of the cellular telephone 1 (STEP 910). Alternatively, the message may be classified as "low priority", and saved for later perusal by the user, with only a nominal passive indication (e.g., visual only) being given that such a "low priority" message has been received. This prevents the user from being bothered by active notification (e.g., beeping) for unimportant incoming messages.

In the preferred embodiment of this aspect of the invention, only the header of the incoming data packets need be examined. If the message is to be rejected as being on an excluded list or not on an included list, as determined by examining the header information, a NAK (No Acknowledgment) or similar signal can be sent back immediately to the source transmitter, so that the user is not billed for receipt of an unwanted call.

The user can define included or excluded sources of messages by simply entering a code corresponding to the included or excluded source into a list in the memory of the cellular telephone 1. The source ID from incoming messages would then be compared to the entries in this list, in known fashion.

Improved Scratchpad

Another aspect of the present invention is an improved "scratchpad" feature which permits a user to enter a telephone number into a storage register of a cellular telephone while in the middle of a voice call. The entered number is then readily accessible for dialing. This feature is particularly useful if the user is talking to another person who gives the user another telephone number to dial. The user can immediately enter that telephone number into the telephone unit while continuing the voice call such that the number is readily available to dial after termination of the current call.

Figure 10:
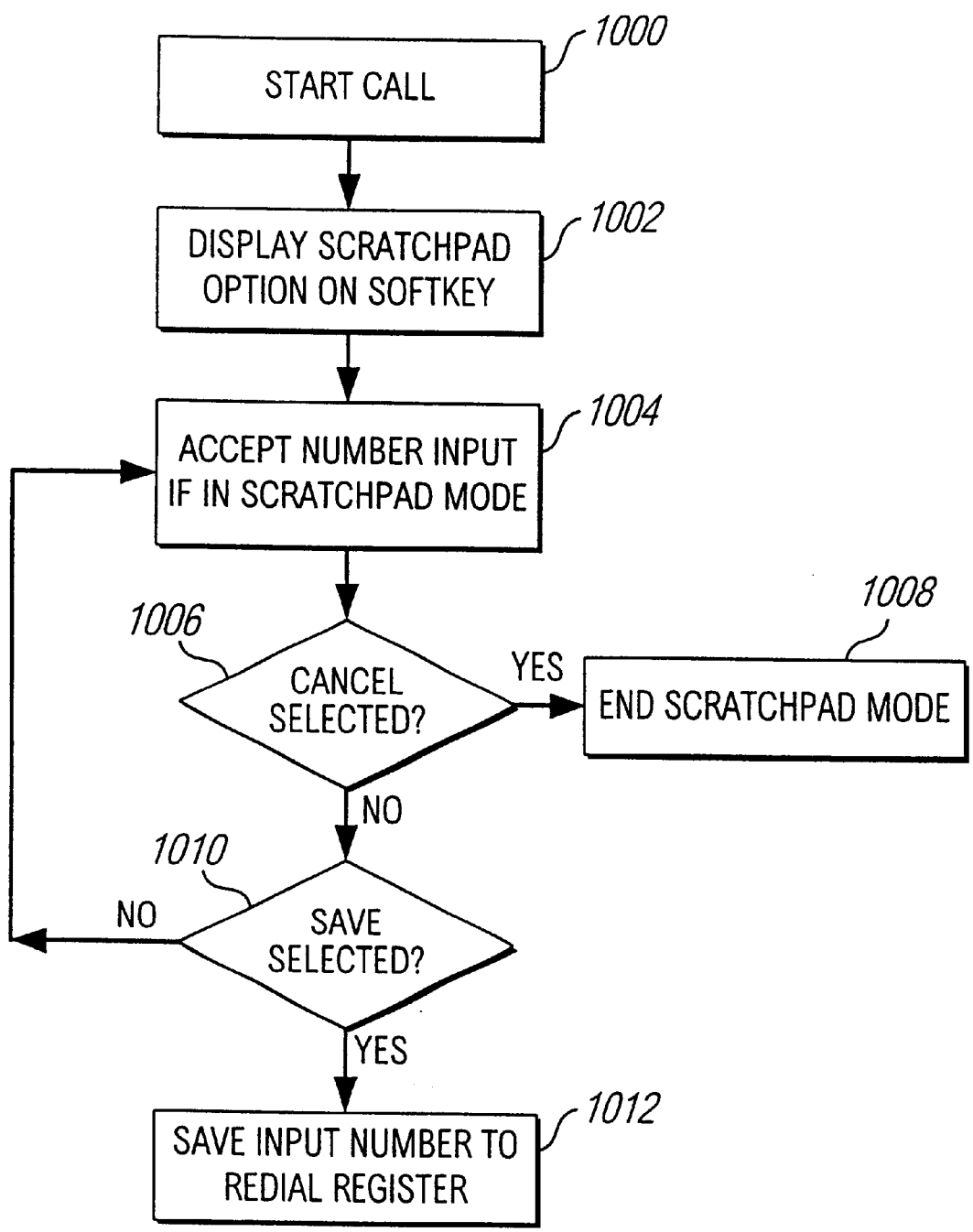
FIG. 10 shows a flowchart depicting a preferred implementation of the improved scratchpad process of the present invention.
Figure 11A:
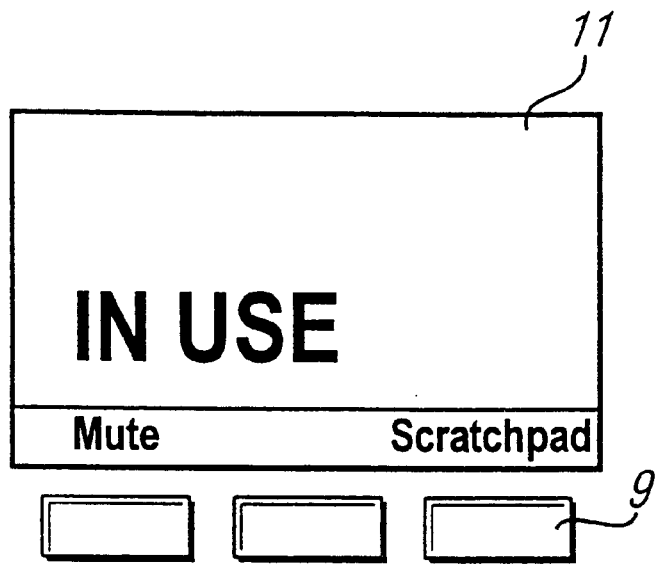
FIG. 11a is a front view of a cellular telephone showing a first example of use of the scratchpad process of the present invention.
Figure 11B:
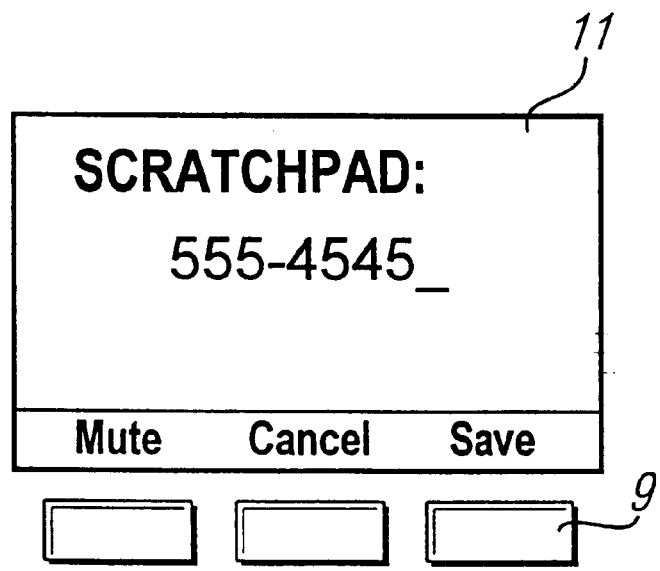
FIG. 11b is a front view of a cellular telephone showing a second example of use of the scratchpad process of the present invention.

FIG. 10 shows a flowchart describing the improved scratchpad process. The process starts by the user initiating a call (STEP 1000). The cellular telephone 1 preferably displays a "SCRATCHPAD" option in the display 11 so as to be associated with a soft key 9, as shown in FIG. 11a (STEP 1002). If the user selects the SCRATCHPAD option, the display 11 changes to indicate that the scratchpad feature has been activated, as shown in FIG. 11b. In this mode, normal dialing is disabled, so that numeric input by the user using the standard telephone keypad 3 on the telephone 1 is not interpreted as further numbers to dial or transmit. The display 11 can then show such numeric input from the user. The input telephone number is displayed on the display 11, as shown in FIG. 11b, for verification by the user (STEP 1004).

In the preferred embodiment, a "CANCEL" function is associated with one soft key 9, and a "SAVE" function is associated with another soft key 9, as shown in FIG. 11b. If the user selects the CANCEL function wile in scratchpad mode (STEP 1006), then the scratchpad mode is terminated (STEP 1008). Otherwise, input continues until the user selects the SAVE function (STEP 1010). Once SAVE is selected, the input number is saved in an internal register within the cellular telephone unit, such as the "last redial" register (STEP 1012), and the display returns to the normal "sin use" mode.

Thereafter, the user can have the cellular telephone 1 dial the number stored during the scratchpad process by invoking, for example, the "last redial" function, in conventional fashion. This may be done, for example, in the preferred embodiment, by pressing the "up" or "down" cursor function keys 7, shown in FIG. 1a. Alternatively, the system can be programmed such that pressing SEND after invoking the scratchpad process and recording a number will automatically dial that saved number.

This aspect of the present invention thus allows a user to record a desired telephone number during a call with positive visual feedback of the input number and easy access to the input number for dialing a next call.

Global Search

Another aspect of the present invention provides a means for searching text strings in the different memory sections of a cellular telephone 1 in accordance with the present invention. As the number of features in such telephones 1 proliferate, the amount of memory dedicated to data storage has increased significantly. A problem with the increase of such memory is that it is sometimes difficult to locate desired data. This is particularly a problem where the memory may be partitioned into different blocks for different purposes. For example, in FIG. 12, the preferred embodiment of the present invention divides physical memory into at least three discrete sections, comprising Menu System Memory 1200, Address Book Memory 1202, and Messages Memory 1204. The Menu System Memory 1200 contains text for the menu system command structure used for control of a cellular telephone 1 in accordance with the present invention. The Address Book Memory 1202 contains storage for data entries relating to conventional address information, such as name and telephone number. The Messages Memory 1204 provides storage for incoming and outgoing data messages for use in cellular phone systems that have a data messaging capability, such as under the CDPD standard.

As is known in the art, it is common to divide such memory into a data structure comprising words or blocks, accessible by an address pointer. The present invention provides a means for searching for text strings in the data structure of a plurality of memory sections of a cellular telephone 1.

It is also commonly known in the art to divide data into logical structures. For example, the cellular telephone 1 may have a complex, multi-level or hierarchical menu structure. One problem of such is structure, especially with a limited display 11, is remembering where particular menu functions are in the hierarchical structure. Accordingly, the present invention allows a user to directly search for a keyword that would appear on a menu or the text associated with a menu command, without having to traverse through the menu hierarchy itself.

Figure 12:
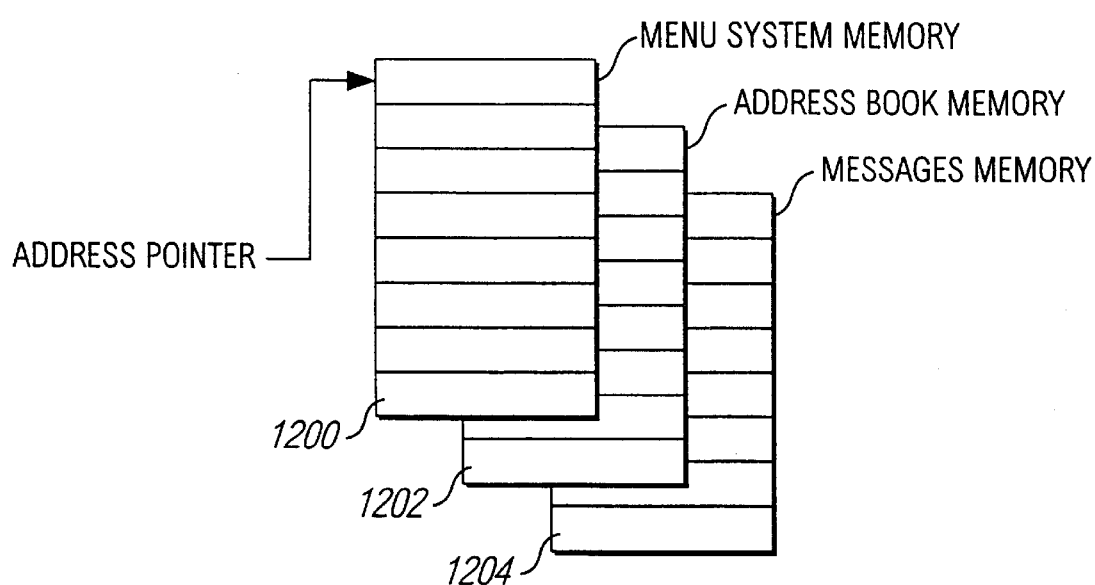
FIG. 12 is a diagram of three physical memory data structures used in accordance with the present invention.
Figure 13:
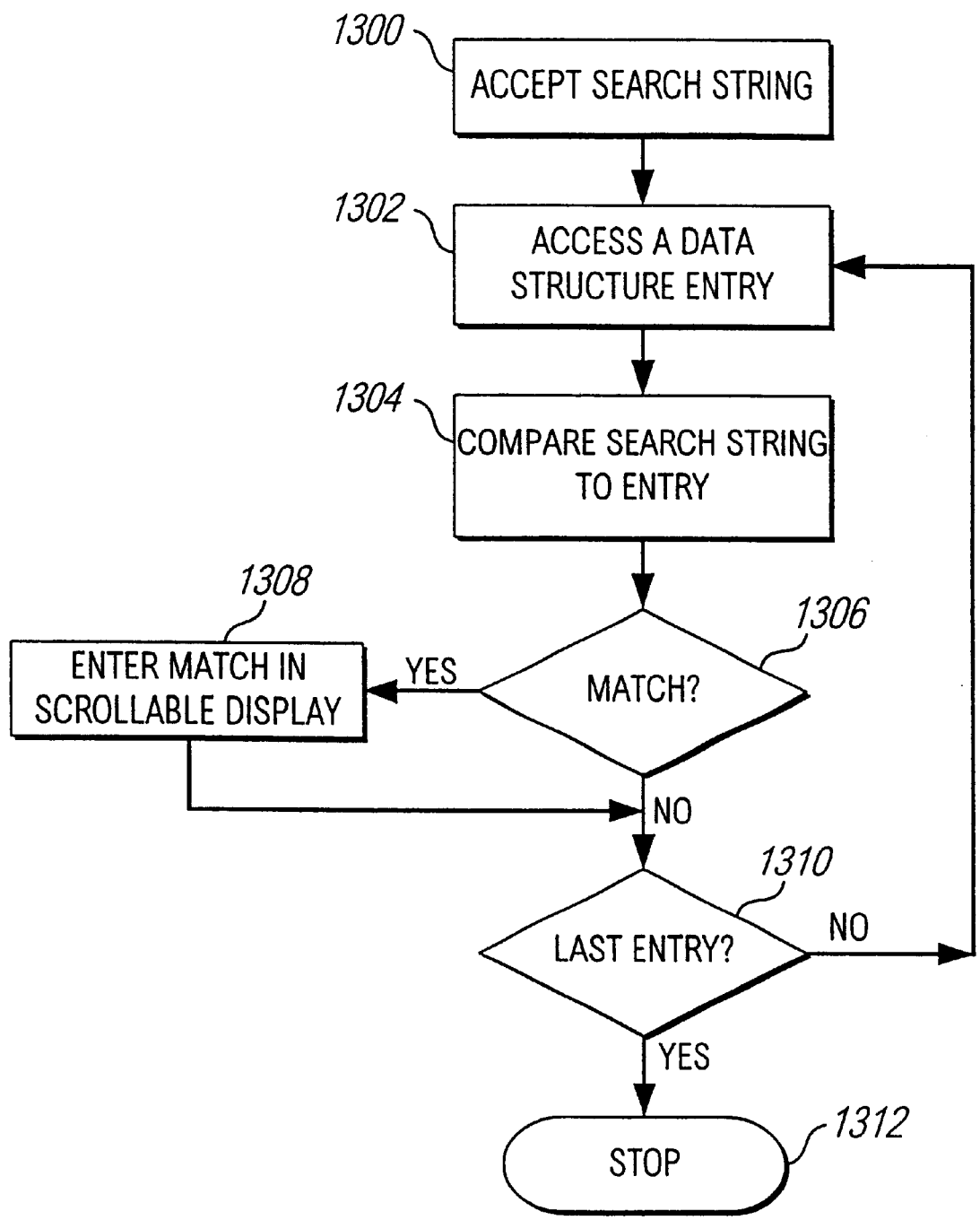
FIG. 13 is a flowchart depicting a preferred implementation of the global search process of the present invention.

FIG. 13 is a flowchart showing the global search capability of the present invention. A user enters a desired search string, which is accepted into the cellular telephone 1 (STEP 1300). The search algorithm may work at the physical storage level (such as is shown in FIG. 12), or at a logical storage level (e.g., by traversing singly or doubly linked lists, sequential data records, hierarchical trees, etc.). In either approach, each addressable entry of the physical or logical data structure is accessed (STEP 1302), and the contents of each entry are compared to the search string (STEP 1304). The algorithm for comparing may be any desired algorithm known in the art. In the preferred embodiment, if a match occurs between the search string and an entry in one of the data structures (STEP 1306), the entire contents of the data structure entry can be entered into a scrollable display so that the user can review the search results at will (STEP 1308). Alternatively, the first match is displayed to the user, and one of the soft keys 9 or programmable keys 7 can be designated as a NEXT function, to search for the nod match. If no match occurs, the search continues at STEP 1310. If the last data structure entry has been searched (STEP 1310), the process stops (STEP 1312). Otherwise, the process continues at STEP 1302.

In the preferred embodiment, a search is conducted concurrently through the data structures comprising the address book, hierarchical menu structure, and stored data messages of the telephone 1. In an alternative embodiment, a search is conducted only through the data structure comprising the hierarchical menu structure of the telephone 1. In yet another alternative embodiment, a search is conducted only through the data structure comprising the stored data messages of the telephone 1.

This aspect of the present invention thus allows a user to readily search memory data structures within a cellular telephone regardless of whether the memories contain menu information, address book information, or message information This unified, global search scheme means that the user can search for information in a plurality of memory structures without having to know in advance in which memory structure the information is likely to be.

SUMMARY

The procedures described above are preferably implemented as computer programs stored on a storage media or device (e.g., ROM) readable by the programmable processing system 13, for configuring and operating the programmable processing system 13 when the storage media or device is read by the programmable processing system 13, the programmable processing system 13 being operated to perform the user interface functions described above.

A number of embodiments of the present invention have been described. Nevertheless, it win be understood that various modifications may be made without departing from the spirit and scope of the invention. For example, a number of the features of the invention can be used with any hand-held communication device, such as two-way pagers, wireless personal digital assistants, cordless telephones, etc. Accordingly, it is to be understood that the invention is not to be limited by the specific illustrated embodiment, but only by the scope of the appended claims.

The invention claimed is:

1. In a cellular telephone having an alphanumeric display and a keyboard having a plurality of programmable keys, a word completion keyboard input method comprising:

accepting a user keystroke from the keyboard of an input character;

displaying the input character on the display;

matching the input character to a dictionary of candidate words stored within the cellular telephone to select at least one candidate word in the dictionary;

displaying at least one selected candidate word on the display, each selected candidate word being visually associated with a corresponding one of the plurality of programmable keys;

accepting a next user keystroke from the keyboard; and if such next input keystroke corresponds to one of the plurality of programmable keys, then displaying the selected candidate word associated with such programmable key as a separate text entry on the display.

2. The invention according to claim 1, including automatically adding new words input by the user to the dictionary.

3. In a cellular telephone system having an alphanumeric display, a keyboard having a plurality of programmable keys, and a programmable processing system, a programmable processing system programmed to:

accept a user keystroke from the keyboard of an input character;

display the input character on the display;

match the input character to a dictionary of candidate words stored within the cellular telephone to select at least one candidate word in the dictionary;

display at least one selected candidate word on the display, each selected candidate word being visually associated with a corresponding one of the plurality of programmable keys;

accept a next user keystroke from the keyboard; and if such next input keystroke corresponds to one of the plurality of programmable keys, to display the selected candidate word associated with such programmable key as text entry on the display, replacing immediately preceding displayed input characters used to select the selected candidate word.

4. The invention according to claim 3, wherein the programmable processing system is programmed to add new words input by the user to the dictionary.

5. A computer program, for use in a telephone system having an alphanumeric display, a keyboard having a plurality of programmable keys, and a programmable processing system, for configuring and operating the programmable processing system to perform the functions of:

accepting a user keystroke from the keyboard of an input character;

displaying the input character on the display;

matching the input character to a dictionary of candidate words stored within the cellular telephone to select at least one candidate word in the dictionary;

displaying at least one selected candidate word on the display, each selected candidate word being visually associated with a corresponding one of the plurality of programmable keys;

accepting a next user keystroke from the keyboard; and if such next input keystroke corresponds to one of the plurality of programmable keys, then displaying the selected candidate word associated with such programmable key as text entry on the display, and replacing immediately preceding displayed input characters used to select the selected candidate word.

6. The invention according to claim 5, including automatically adding new words input by the user to the dictionary.

\* \* \* \* \*